Dec. 17, 1929.  J. O. BEWAN  1,739,493
TRAP
Filed June 7, 1928  2 Sheets-Sheet 1
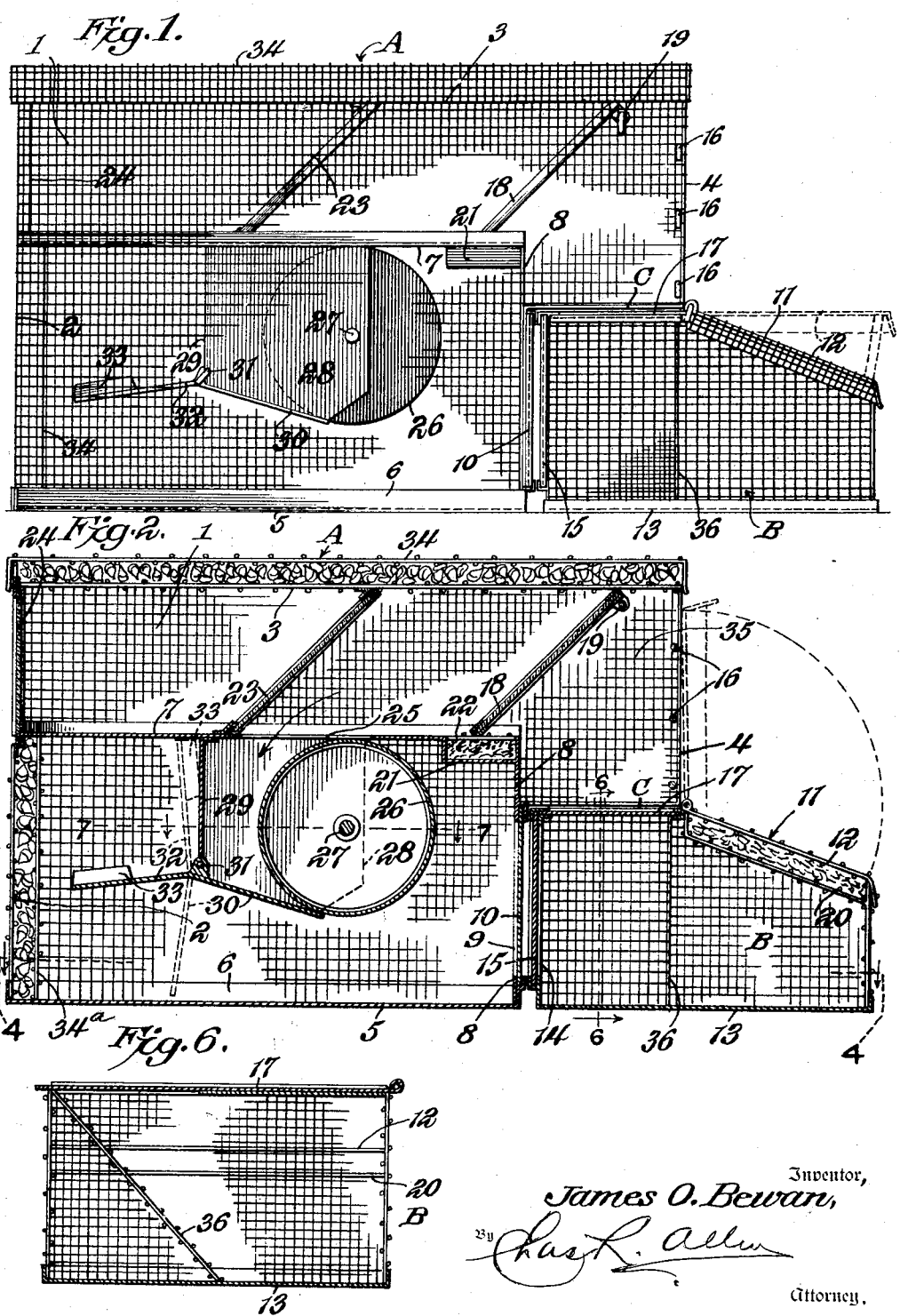
Inventor,
James O. Bewan,
By Chas. R. Allen
Attorney.

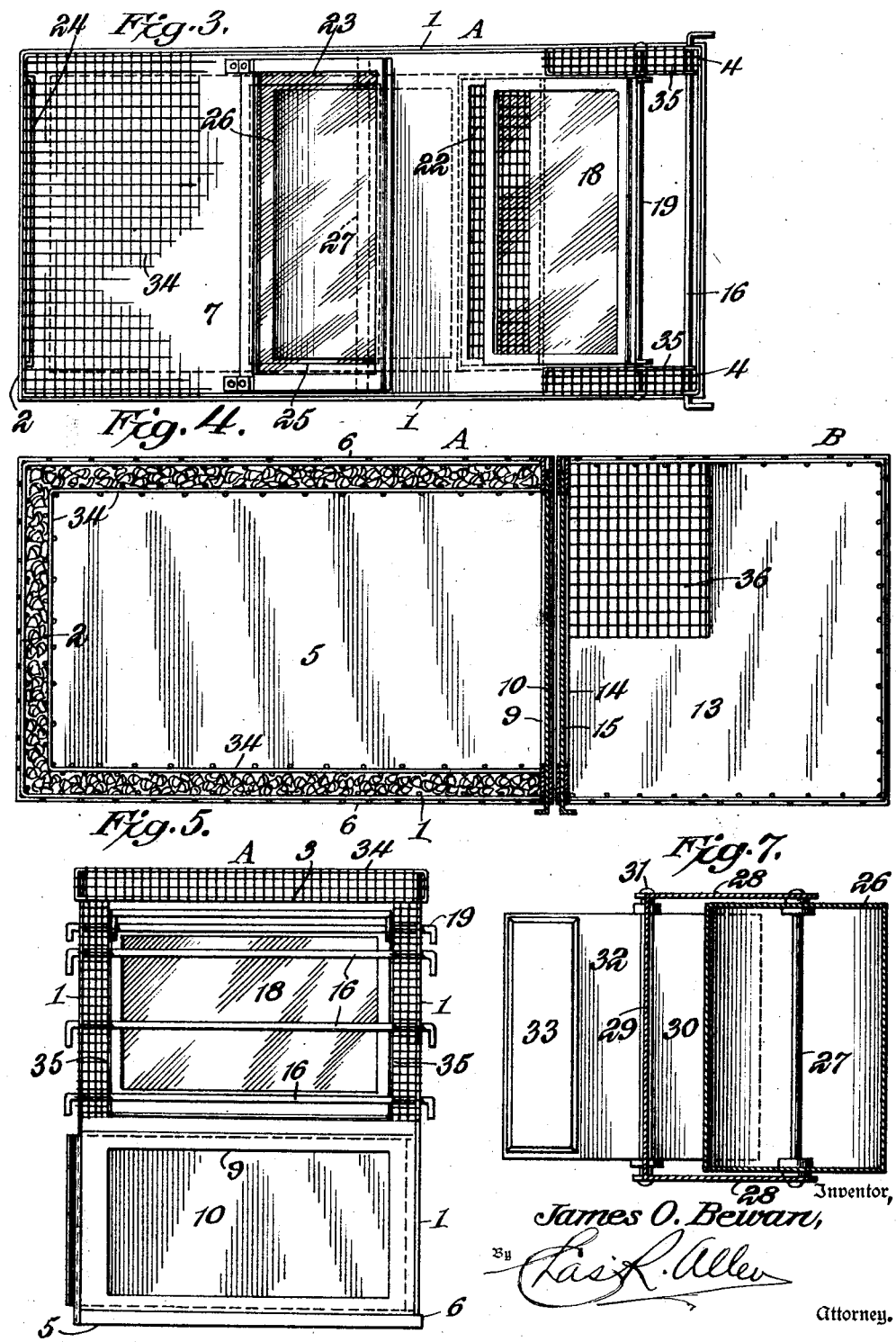

Patented Dec. 17, 1929

1,739,493

UNITED STATES PATENT OFFICE

JAMES O. BEWAN, OF MIAMI, FLORIDA

TRAP

Application filed June 7, 1928. Serial No. 283,576.

This invention relates to traps and especially to traps for catching mice, rats or other rodents.

The object is to provide a trap which may be readily placed in the runways of rodents to automatically act to entrap the same, after first enticing them to enter the trap by means of permanently fixed bait arranged in a novel manner to prevent consumption thereof by the rodents and then causing them to be lured to the rear of the trap and precipitated, without chance of return and without injury, into the trap proper, from whence they may be readily removed.

Another object is to provide a trap composed of two co-acting sections or elements, whereby one section or element may be left to remain in position for further trapping of rodents, while the other section or element is being used to remove the rodents to a point for disposing of the same, the removable element constituting, when in co-acting relation to the trapping element, a runway and platform for the rodents upon entering the trapping element, and also having means for causing the rodents to be held from escape at the entrance, should they hesitate to enter the trap, and to be directed immediately into the removable element.

A full and complete understanding of the invention may be obtained from a consideration of the following detailed description taken in connection with the accompanying drawings forming a part of the specification; it being understood that while the drawings show a practical form of the invention, the latter is not to be confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:

Figure 1 is a side elevation of the improved trap,

Figure 2 is a longitudinal section through the same,

Figure 3 is a top plan view of the rat trapping member of the device,

Figure 4 is a complete horizontal sectional view, taken on the line 4—4 of Figure 2, Figure 5 is a front end elevation of the trapping member of the device, Figure 6 is a transverse vertical section through the rat removing member of the device, the section being taken on the line 6—6 of Figure 2, and Figure 7 is a detail horizontal sectional view taken on the line 7—7 of Figure 2.

The device of the present invention is designed for the capture of rodents of various kinds and sizes, it being obvious, upon a perusal of the following detailed description, that the same may be built in smaller size for use in trapping mice or the like, while larger sizes, may be employed for the capture of rats, mink, weasels or other like animals, and throughout the following specification it will be assumed that the illustrated form of the invention is designed for the capture of rats and this term will be exclusively used.

The trap comprises a major portion constituting a rat trapping member A and a supplemental portion B, constituting the rat removing member which is preferably used in connection with the trapping means and which may be readily removed from the member A, being a separate member, and used for disposing of the rats, while the trapping means is left in position for uninterrupted use in trapping.

The trapping member A comprises a cage-like structure, preferably of rectangular form consisting of spaced walls 1 formed of foraminous material such as wire fabric of suitable strength depending upon the size and the use to which the trap is to be put; a rear wall 2 formed of similar material, and a foraminous top wall 3 extending the full length of the major portion of the trap.

The lower front corners of the side walls are cut away to provide a recess C of a height substantially equal to the height of the member B, and in which the latter is adapted to be located when in use, with the rear end of the member B in substantially abutting relation to the vertical wall of the recess C, as clearly shown in Figures 1 and 2 of the drawings.

The front end 4 of the overhanging portion of the trapping member is normally open while the bottom 5 of the trapping member is formed of a sheet of suitable imperforate metal extending from the rear wall to the vertical portion of the recess C and having upturned marginal flanges 6 to which the lower edges of the sides and rear end of the wire mesh may be suitably fastened.

Mounted within the trapping member A there is a horizontal platform 7 of imperforate sheet metal, elevated somewhat above the upper end of the recess C and joined to a vertical wall or partition 8 which extends downwardly to form a front wall for the lower portion of the member A and is joined to the front flange of the bottom 5. This front end wall 8 is provided with an exit opening 9 having upper and lower guiding flanges for the reception of a sliding door 10 which may be slid horizontally to one side of the trap to uncover the opening for the purpose of disposing of the trapped rats in a manner to be described.

When in use in trapping rats, the member B which, as has been stated, fits beneath the overhanging portion of the member A, acts as a runway for the rats to enter the open front end of the member A and for this purpose the outer front end of the member B, where exposed beyond the open end 4, is inclined, as shown at 11, and is provided with a hinged door or closure 12. The member B is likewise formed of foraminous material such as relatively heavy wire mesh to form a cage substantially equal in width with the trap A and having an imperforate bottom 13 provided with marginal flanges for securing the said walls thereto. The inner or rear wall of the removal cage B is provided with an opening 14 equal in size to the aforesaid opening 9 and having a horizontally slidable closure plates or door 15 mounted in suitable upper and lower guide flanges whereby when it is desired to remove a rat or rats from the trap, it is only necessary to open both doors 10 and 15 respectively, when the rats will enter the smaller member B and the doors are closed to permit the member B to be removed for the disposal of the rat or rats.

In order to facilitate the removal of the rats from the cage B, when brought to the proper place of disposal, not only may the door 15 be opened for the purpose, but a similar horizontally disposed sliding door or closure 17, located in the top horizontal portion of the cage B, may also be slid open to allow the rodents to leave the cage B and be disposed of as desired.

The inclined upper surface of the door 12 enables a rat to readily step or jump upon the same and to enter the open end of the trap proper which is preferably provided with a plurality of cross bars 16 which serve to prevent larger animals or rodents from attempting to enter the trap and become lodged in certain parts of the device to be later described, and defeating the purpose thereof.

The door 17 also serves as a platform for the rodents to step on when passing between the rods 16 at the entrance opening and to enable them to mount upon the elevated platform 7. The rat after entering between the rods 16 is enabled to see entirely through the trapping member, by means of a glass or other transparent panels which serve as confining means but have the effect of presenting an apparent unobstructed passage to entice the rat to proceed further in an effort to pass through and escape. The transparent panel 18 to be first encountered is inclined as shown, the same being mounted in a suitable frame which is hinged at its upper edge upon a rod 19 passing transversely through the trap and located adjacent to the front open end of the latter, the said panel being inclined inwardly with the lower edge of its frame resting upon the platform 7 at a point adjacent to the juncture with the upper edge of the wall 8, so that the rat may push against the lower portion of the panel with the result that it will be raised inwardly allowing the rat to enter beyond, when the panel will immediately fall again upon the platform 7 and his return movement is prevented.

In order to first attract the rat and to entice him to mount upon the inclined runway 12, suitable bait is located immediately below the latter and is supported by an inclined, foraminous bottom wall 20 and likewise in order to further attract the rat and to entice him to push the aforesaid transparent panel 18 upwardly in his efforts to investigate, another bait receptacle 21 is located at the immediate front end of the horizontal platform 7, said receptacle being provided with imperforate bottom and side walls and extending the full width of the platform with a suitable wire mesh cover 22 flush with the platform to prevent the rat from eating the bait and to act as a support for the panel 18 as well as to enable the rat to pass over the same. From this point the rat can readily see through the trap by means of an inclined transparent panel 23 rigidly fixed between the platform 7 and the top wall 3 of the trap and a rigidly fixed vertical transparent panel 24 secured in the rear wall 2 of the trap and between the platform 7 and the top wall 3. The inclined panels 18 and 23 respectively, are spaced apart a sufficient distance to allow of considerable movement of the rat, and upon finding his return barred by the panel 18 which has fallen behind him, will attempt to pass on through the panel 23 which is immovable, and he will be precipitated through an opening 25 formed in the platform, the speed of his movement being accelerated by a roller or drum 26. The drum 26 is mounted to freely revolve upon a shaft 27 which is mounted in side walls 28 formed of sheet metal and depending from the lower face of the platform 7, the rear edges of the walls 28 being joined by an imperforate rear-wall 29 to confine the rat to the drum in his downward course. The lower edges of the walls 28 and 29 are spaced from the bottom 5 of the trap, the said rear wall being also spaced from the rear wall of the drum a sufficient distance to provide ample space for the passage of the rat in his downward course. A counterweighted closure plate or door 30 is pivoted at 31 to the lower edge of the rear wall 29 and bears at its front edge against the lower wall of the drum, as clearly shown in Figure 2 of the drawing, said door having an extension 32 projecting rearwardly and provided with a weight 33 which serves to hold the door against the drum and prevent rats from attempting to pass upwardly around the roller.

The sides and rear foraminous walls of the trap extend somewhat above the fixed top 3 thereof to form a receptacle for some form of bait which will not readily spoil, such as corn, to constantly attract the rats. In order to hold the corn therein and prevent its being consumed, a supplemental top 34 is adapted to be frictionally held over the trap in spaced relation to the top wall 3 and to be removed when it is desired to renew the bait. In addition to this, the sides and rear wall of the trap proper below the horizontal platform 7, are adapted to be lined with a wall of corn or the like, by means of an inner foraminous wall 34ᵃ extending from the bottom 5 to the said platform and serving to hold the bait in place to add to the enticement of the rodents, and for the same purpose an inner foraminous wall 35 is located at the open entrance to the trap, at each side thereof, to serve as pockets for corn or the like, the front swinging panel 18 operating between said pockets, as clearly shown in Figures 3 and 5 of the drawings.

It will be seen that when the rat is falling with relatively great force induced by the revolving drum, he will strike the door 30, lowering the same and raising the weight, as indicated in dotted lines in Figure 2, causing the rat to land upon the bottom 5 when his first impulse is to quickly move to escape, and the weight will immediately close the door.

In the event a rat does not attempt to raise the first panel 18, after passing between the bars 16, he may, providing an attendant is present, be trapped by the mere swinging upwardly of the hinged closure 12, as indicated in dotted lines in Figure 2, when the attendant may then slide the top door 17 of the cage B open to allow the rat to fall within said cage and then close the slide again.

When the cage B is removed for disposing of the rats, the latter may be induced to leave the cage by means of an inclined runway 36 through the top, or through the opening 14.

From the foregoing, it is thought a clear understanding of the construction and arrangement of the parts of the device may be obtained and of the operation of the invention for trapping mice, rats or other larger rodents, depending upon the size and proportions of the various parts and elements of the invention. The removable member B has been found to be especially advantageous where mice or rats, etc., are particularly numerous as it is desired to allow the trap proper to remain in a particularly advantageous position while the cage B is perhaps being carried to a point where the trapped rodents may be disposed of. It will be further seen that ample space is provided for the reception of suitable bait for enticing the rodents to investigate the trap and to enter therein, the bait being so disposed as to present almost a complete wall around the trap and yet being guarded from consumption by the rodents to remain indefinitely within the trap. The bait in the surrounding side walls and within the pockets formed by the walls 35 at the entrance of the trap may consist of corn or other grain which may be readily held by the wire mesh, while it is preferable to use other bait, such as meat, cheese or the like in the receptacles in the member B and at the lower edge of the first swinging transparent panel 18. The corn or other grain may be readily poured into the spaces by means of suitable openings (not shown) in the wire mesh where the said grain may not fall out, after the parts of the trap are assembled, whereas the removable top cover member 34 provides means for inserting the grain at the top of the device. Furthermore, it will be seen that the provision of the alined transparent panels allow an unobstructed vision entirely through the trapping element to cause the rodents to advance more fearlessly and surely by being able to see an apparent exit at the other end of the trap. Emphasis is also placed upon the means for entrapping the rodents at the entrance by swinging the cover 12 upwardly and opening the slide 17 to cause them to fall immediately into the removable element B, the said cover serving, when in normal position to cover and protect the bait therein and to act as a runway to the trap proper.

I claim:

1. In a trap for rodents; a cage-like body member having an intermediate horizontal platform and an entrance opening at the front end above said platform; trapping means located in the platform to precipitate the rodents below the same; transparent panels arranged between the platform and the top of the body member, the front panel being swingable upwardly to permit the rodent to advance to the trapping means; and a cage-like rodent-removing member adapted to be placed beneath the entrance opening and having slidable doors to receive a rodent either from the entrance or from the front end of the body member.

2. A trap for rodents comprising a main body member and a supplemental member operatively associated therewith; said body member having a horizontal platform intermediate of its height and extending forwardly above the platform and open for the entrance of rodents; transparent panels mounted transversely above the platform to permit an unobstructed view through the body member; the first panel being hinged to swing rearwardly and upwardly; means in rear of the first panel to precipitate the rodents below the platform; said supplemental member being adapted to fit beneath the said forwardly extending portion and having its front end extending beyond the same and provided with an inclined hinged cover to form a runway to the entrance when down and a closure to the entrance when swung up.

3. A rodent trap comprising a substantially rectangular main body member formed of foraminous material and having an imperforate bottom and horizontal platform intermediate of its height, the sides and rear walls below the platform, and also the top, being double to provide spaces for grain, the sides and top extending forwardly beyond the lower portion of the body to provide an entrance opening; adjustable spaced bars transversely crossing the opening to exclude larger rodents; a supplemental member formed of foraminous material and adapted to be placed beneath the entrance and projecting in advance of the same, said supplemental member having a sliding door beneath the entrance and an inclined hinged cover on its front portion, a sliding door in the rear wall of the supplemental member, a co-acting sliding door in the front wall of the body member below the platform, and means mounted in the platform to cause the rodent to pass from the upper to the lower portion of the body member to be trapped.

4. A rodent trap comprising a substantially rectangular main body member formed of foraminous material and having an imperforate bottom and a horizontal platform intermediate of its height, the sides and rear walls below the platform, and also the top, being double to provide spaces for grain, the sides and top extending forwardly beyond the lower portion of the body to provide an entrance opening; spaced bars transversely crossing the opening to exclude larger rodents; a supplemental member formed of foraminous material and adapted to be placed beneath the entrance and projecting in advance of the same, said supplemental member having a sliding door beneath the entrance and an inclined hinged cover on its front portion, a sliding door in the rear wall of the supplemental member; a co-acting sliding door in the front wall of the body member below the platform; means mounted in the platform to cause the rodent to pass from the upper to the lower portion of the body member to be trapped, said means including an opening formed in the platform in rear of the entrance; a transversely disposed roller mounted below the opening; a vertical transverse wall spaced from and in the rear of the roller to form a channel; a counterweighted closure pivoted to the lower edge of the wall and engaging the roller to prevent return of the rodents; and a swinging panel between the opening and the entrance to prevent the rodent from passing out of the entrance.

In testimony whereof I hereunto affix my signature.

JAMES O. BEWAN.